United States Patent
Henkel et al.

(10) Patent No.: US 6,815,660 B2
(45) Date of Patent: Nov. 9, 2004

(54) OPTOELECTRONIC MONITORING DEVICE

(75) Inventors: Olaf Henkel, Reute (DE); Martin Wuestefeld, Sexau (DE)

(73) Assignee: Sick AG, Waldkirch/Breisgau (DE)

( * ) Notice: Subject to any disclaimer, the term of this patent is extended or adjusted under 35 U.S.C. 154(b) by 34 days.

(21) Appl. No.: 10/222,674

(22) Filed: Aug. 15, 2002

(65) Prior Publication Data

US 2003/0047672 A1 Mar. 13, 2003

(30) Foreign Application Priority Data

Aug. 30, 2001 (DE) .......................................... 101 42 362

(51) Int. Cl.$^7$ ............................. G06M 7/00; H01J 40/14
(52) U.S. Cl. ....................................... 250/221; 340/556
(58) Field of Search ............................. 250/221, 578.1, 250/559.4; 340/556, 506

(56) References Cited

U.S. PATENT DOCUMENTS

| | | | |
|---|---|---|---|
| 2,241,556 A | | 5/1941 | MacMillin et al. |
| 4,310,756 A | * | 1/1982 | Sick et al. .................. 250/221 |
| 4,652,205 A | * | 3/1987 | Ross et al. .................. 700/259 |
| 4,742,337 A | * | 5/1988 | Haag .......................... 340/556 |
| 5,825,803 A | * | 10/1998 | Labranche et al. ......... 372/101 |

FOREIGN PATENT DOCUMENTS

| | | |
|---|---|---|
| DE | 1170286 | 5/1964 |
| DE | 3833022 C2 | 4/1990 |
| DE | 19544632 A1 | 6/1997 |
| DE | 19546632 A1 | 6/1997 |
| DE | 29714438 U1 | 10/1997 |
| DE | 19718390 A1 | 11/1998 |
| DE | 19909518 A1 | 10/1999 |
| DE | 19938639 A1 | 2/2001 |
| DE | 10033608 A1 | 2/2002 |
| EP | 0897123 A2 | 8/1998 |

* cited by examiner

*Primary Examiner*—David Porta
*Assistant Examiner*—Seung C. Sohn
(74) *Attorney, Agent, or Firm*—Townsend and Townsend and Crew LLP

(57) ABSTRACT

The invention relates to an optoelectronic monitoring device for the detection of objects intruding into a monitored zone comprising at least one transmitter, in particular a light grid, arranged at an end of the monitored zone and having a group of transmission elements spaced apart from one another and each transmitting electromagnetic radiation into the monitored zone, at least one reflector arranged at an end of the monitored zone opposite the transmitter for radiation transmitted by the transmission elements, at least one receiver which has at least one spatially resolving reception element for radiation reflected by the reflector, and an evaluation device coupled with the reception element, wherein the transmitter, the reflector and the receiver are made and arranged such that, during the monitoring operation, at least a part of the group of transmission elements comprising a plurality of transmission elements is imaged on the reception element by means of the reflector and a check is made by means of the evaluation device as to whether a pattern on the reception element formed by the imaged transmission elements deviates from an expected image of the transmission elements. The invention further relates to a method of detecting objects intruding into a monitored zone.

15 Claims, 5 Drawing Sheets

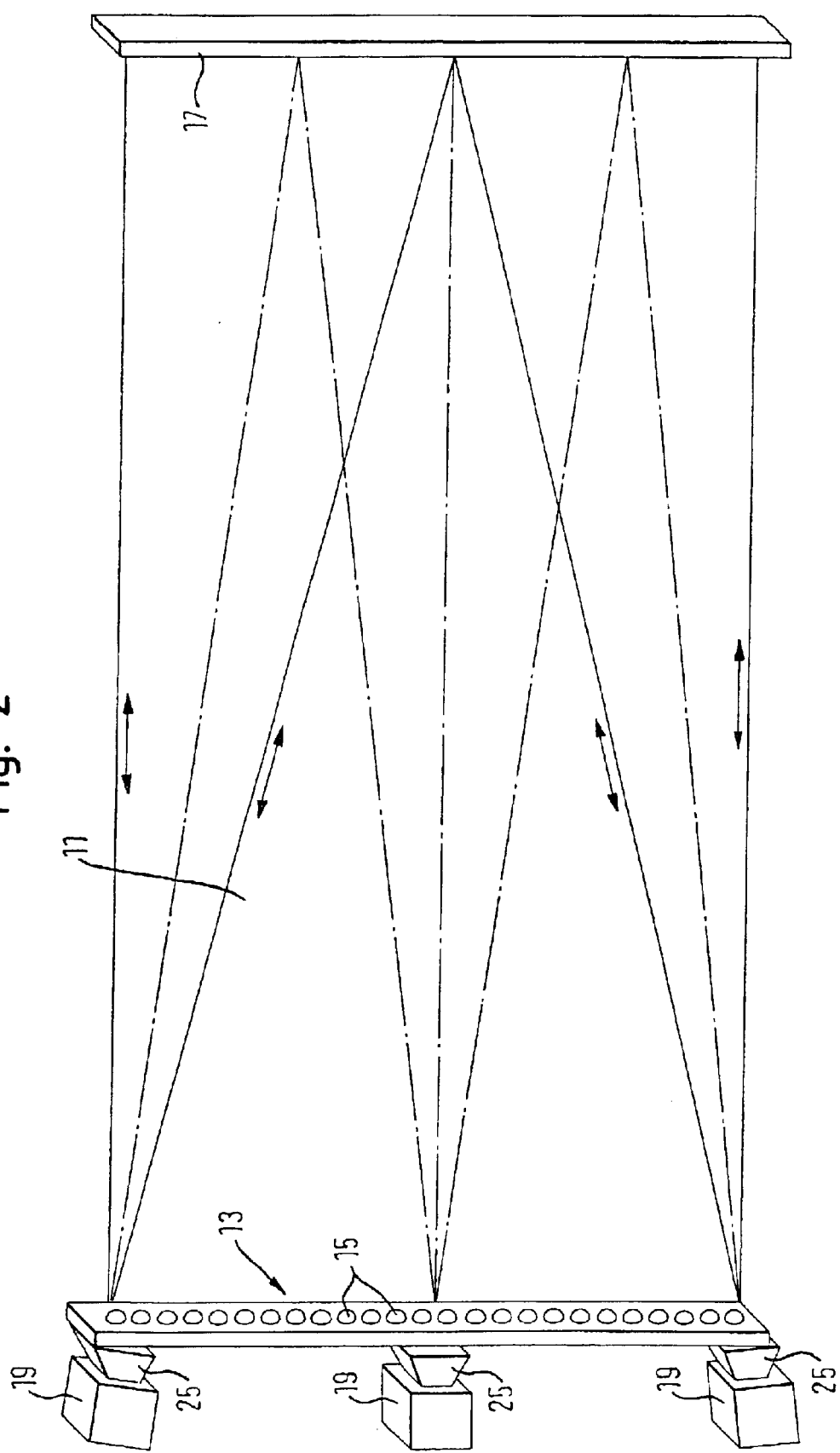

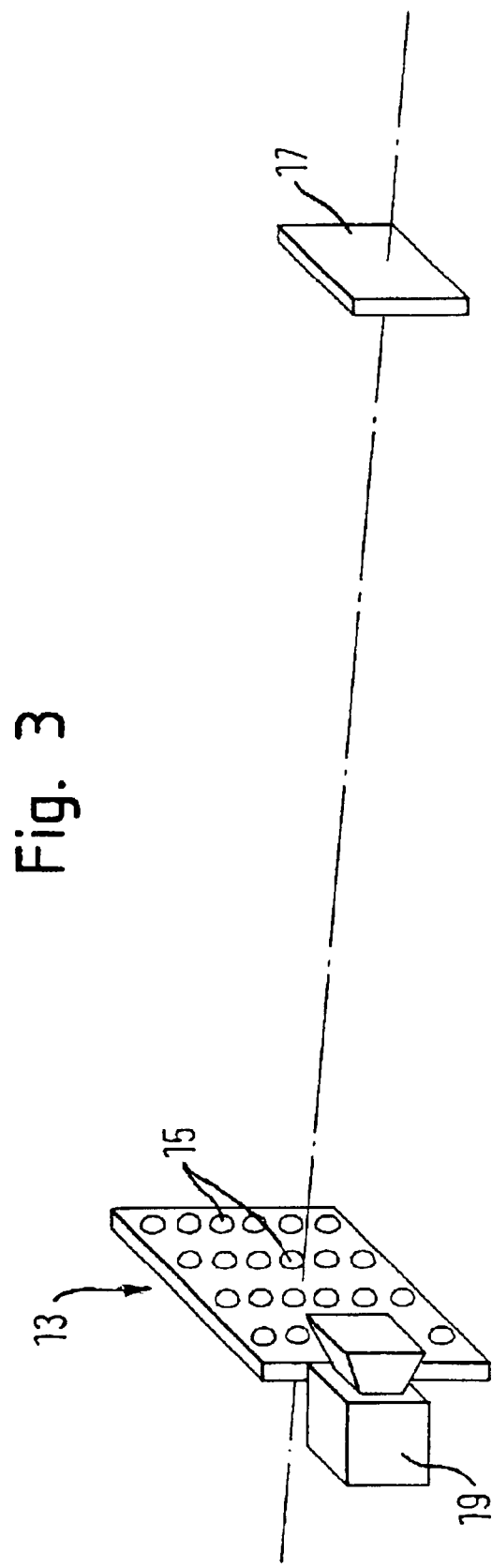

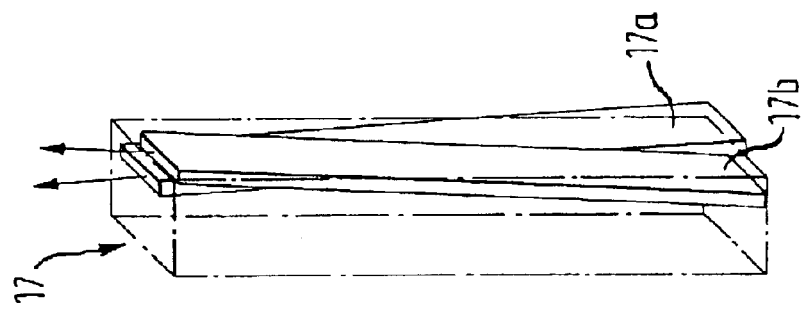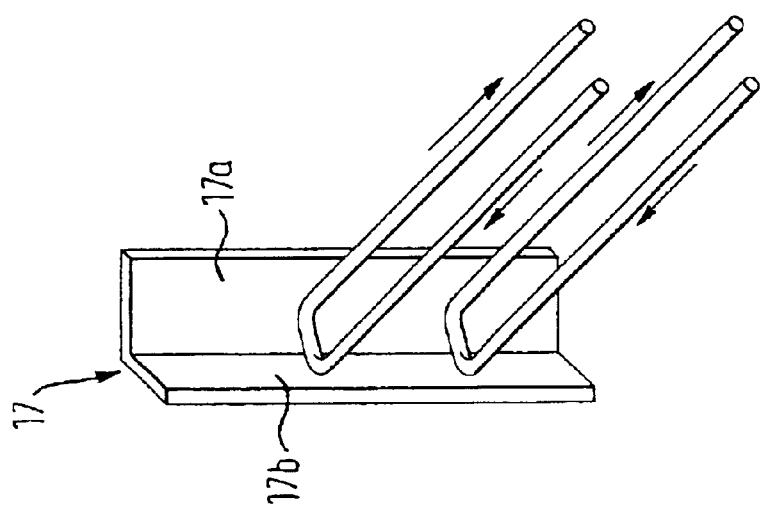

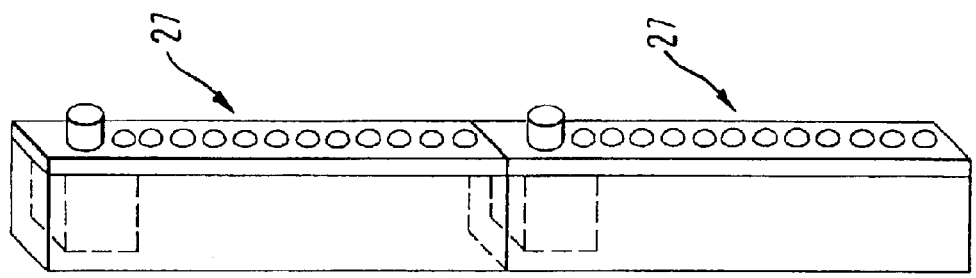
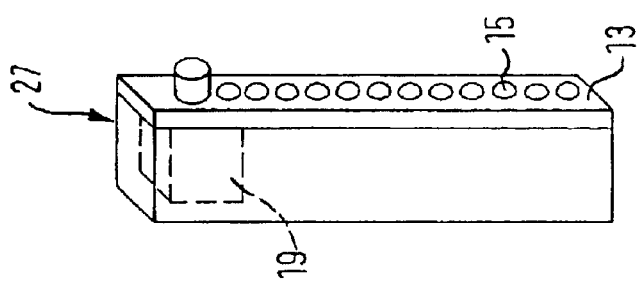
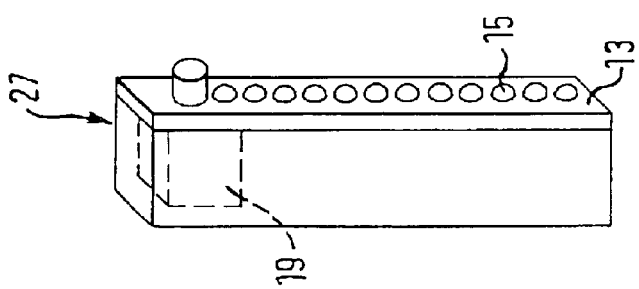
Fig. 5

OPTOELECTRONIC MONITORING DEVICE

BACKGROUND OF THE INVENTION

The invention relates to an optoelectronic monitoring device comprising at least one transmitter arranged at an end of a monitored zone, at least one reflector arranged at an end of the monitored zone opposite the transmitter for electromagnetic radiation transmitted by the transmitter and at least one receiver for radiation reflected by the reflector. The invention further relates to a method of detecting objects intruding into a monitored zone.

Such monitoring devices and detection methods are generally known and serve to detect objects intruding into the monitored zone. The use of such monitoring devices takes place, for example, at hazardous machinery or at devices relevant to safety at which the intrusion of objects or persons, or individual body parts, into the monitored zone, also known as the protected zone, should be prevented. The monitoring device in this manner provides for the safety of the persons working on the machine or for the security of the monitored or protected zone.

SUMMARY OF THE INVENTION

It is an object of the invention to provide an optoelectronic monitoring device of the kind first named which, while functioning reliably, is as secure as possible against manipulation and is as insensitive as possible with respect to external interference radiation and which should in particular have a favorable cost and allow the detection of objects in the monitored zone with high resolution. Furthermore, an improved detection method should be provided.

This object is satisfied, on the one hand, in that the transmitter has a group of transmission elements which are spaced apart from one another and which each transmit electromagnetic radiation into the monitored zone. A receiver has at least one spatially resolving reception element for radiation reflected by the radiator and an evaluation device is provided which is coupled to the reception element. The transmitter, the reflector and the receiver are made and arranged such that, during the monitoring operation, at least one part of the group of transmission elements including a plurality of transmission elements is imaged on the reception element by means of the reflector so that a check can be made by means of the evaluation device as to whether a pattern on the reception element formed by the imaged transmission elements deviates from an expected image of the transmission elements.

In accordance with the invention, the transmission elements of the transmitter and the reception element of the receiver form an active side and the reflector at the end of the monitored zone opposite the transmission elements forms a passive side of the monitoring device. If the radiation transmitted by at least one transmission element is interrupted, e.g. by an object intruding into the monitored zone, then this infringement of the monitored zone, or protected zone, is recognized in that a deviation of the pattern detected on the reception element from the expected image of the transmission elements occurs by means of the evaluation device. In this connection, the resolution of the monitoring device, i.e. the detection limit, is defined by the distance of the transmission elements from one another. The resolution of the device can generally be increased as desired by the selection of a correspondingly low spacing between the transmission elements, which preferably lie in one plane and form radiation sources.

In accordance with the invention, only a single reception element is required for the group of transmission elements, i.e. it is not necessary to associate a receiver with every transmission element. A particularly cost favorable active/passive construction is thereby realized. Alternatively, in accordance with the invention, a plurality of reception elements can also be provided.

A further advantage of the monitoring device of the present invention consists of the fact that any displacement of the passive part, i.e. of the reflector, relative to the active part is recognized, since the pattern of the group of transmission elements detected on the reception element deviates from the expected image of the group of transmission elements with a relative arrangement between the transmitter, the reflector and the receiver not in accordance with their purpose. As a result, the monitoring device of the invention is highly secure against manipulation. A deflected reflection of the radiation transmitted by the transmission elements, e.g. by introducing additional beam deflection means into the beam path, carried out for purposes of manipulation, results in a spatial displacement of the imaged transmission elements on the reception element, which is recognized by comparing the actually detected pattern of the transmission elements with the expected pattern.

Further, the imaging of the transmission elements advantageously takes place in accordance with the invention such that interference radiation not originating from the transmission elements cannot impact in the regions of the reception elements in which the radiation transmitted by the transmission elements and reflected by the reflector is detected. As a result, the monitoring device of the invention is highly secure against interference radiation.

Respectively separate units are not necessarily to be understood as the transmission elements in the sense of the invention; the transmission elements can rather be radiation sources generally realized in any manner. The wavelength of the radiation used can generally be any wavelength in accordance with the invention and can lie both in the range visible to the human eye and in the range invisible to the human eye.

The radiation sensitive area of the reception element is preferably smaller, and in particular substantially smaller, than the area over which the transmission elements are distributed. The imaging of at least some of the transmission elements is preferably achieved by an optical imaging system of the receiver which is matched to the respective circumstances and which is interposed in front of the reception element, with the optical imaging system or the optical receiving system preferably having a multi-lens system.

In a preferred practical embodiment of the invention, provision is made that the receiver is arranged in the region of the transmitter and preferably in direct proximity to the transmitter. It is particularly preferred for the receiver and the transmitter to be combined to form one module. An advantageous modular construction is thereby made possible in which a plurality of modules including at least one respective transmitter and at least one receiver can be combined together to form a transmission/reception system. With such a modular system, low demands result in an advantageous manner on the number of transmission elements per module, which is required for monitoring security which is sufficient in accordance with the respective application, and on the opening angle of the modules.

In accordance with a further preferred embodiment of the invention, a single row arrangement of transmission elements is provided. A narrow construction of the active side of the monitoring device, which is advantageous for certain applications, can be achieved by this one-dimensional arrangement of the group of transmission elements. The receiver, or its reception element, is preferably arranged on a line with the row of transmission elements, but can also be positioned to the side of the transmission elements.

A two-dimensional arrangement of the transmission elements, and thus a three-dimensional monitored zone, is achieved in accordance with a further preferred embodiment in that a multi-row arrangement of the transmission elements is provided. In this connection, these elements preferably form lines and gaps extending perpendicular to one another. The transmission elements can also be arranged asymmetrically.

A further embodiment of the invention provides for at least one reception element to be provided on which the group of transmission elements is completely imaged. Precisely one such reception element is preferably provided. The number of individual components for the monitoring device in accordance with the invention is thereby minimal.

Alternatively, it is also possible in accordance with the invention for a plurality of reception elements to be provided which are spatially separated from one another. In this way, the monitored zone can generally be given any desired shape. For example, only part of the group of transmission elements can be respectively imaged on each reception element. It is, however, preferred for all transmission elements to be imaged on each reception element, whereby a particularly high monitoring security is achieved. Generally, a plurality of transmission elements can simultaneously be imaged on a plurality of reception elements.

In accordance with a further preferred practical embodiment of the invention, the reflector includes a mirror unit. In a particularly simple, and thus low price, embodiment, the mirror unit includes precisely one plane mirror.

The reflector can furthermore include a plurality of individual reflectors which are preferably each formed by a plane mirror.

An overlapping of individual regions of the monitored zone, which is advantageous for specific applications, can be achieved in accordance with a further preferred embodiment of the invention in that the reflector includes at least two individual reflectors tilted with respect to one another.

In accordance with a further preferred embodiment of the invention, the reflector is made as a retro-reflector or as a triple mirror or in the form of, for example, a roof-shaped reflector which acts as a retro-reflector or as a triple mirror at least with respect to a radiation propagation plane. The monitoring device of the invention is thereby given an advantageous tolerance with respect to inexact alignments; i.e. the angular availability of the monitoring region is increased since the incident radiation is reflected parallel to the direction of incidence irrespective of the angle of incidence.

In a particularly simple realization, the reflector can here include only two plane mirrors, which extend at right angles to one another, and in particular be made as a so-called roof-type reflector. A reduction in the design height, with a simultaneous increase in the angular availability, is achieved in accordance with an alternative embodiment of the monitoring device in accordance with the invention if the reflector includes a plurality of such individual reflectors which are arranged next to one another and e.g. each have an elongate shape. With the same angular availability, it is therefore possible to reduce the design height of the total reflector in an advantageous manner by the provision of a plurality of individual reflectors which can also be provided in the form of individual retro-reflectors.

LEDs are preferably provided as the transmission elements, with generally any kind of radiation source being able to be used. The reception element of the receiver is preferably made areally and is preferably a CCD device, a CMOS device or a PSD (=position sensitive device) device. In particular when a CCD device is used as the reception element, the transmitter is designed such that the transmission elements are operated synchronously. A pulsed operation of the transmission elements is preferably provided for the case that a PDS device is used as the reception element. Generally, the reception element can have any kind of design and be made, for example with one line or as a reception matrix.

The object underlying the invention is satisfied, on the other hand, in that electromagnet radiation is transmitted into the monitored zone by means of a group of transmission elements arranged at an end of the monitored zone and spaced apart from one another. Radiation transmitted by the transmission elements is reflected at an end of the monitored zone opposite the transmission elements such that at least a part of the group of transmission elements including a plurality of transmission elements is imaged on at least one spatially resolving reception element. A check is made as to whether a pattern formed by the imaged transmission elements on the reception elements deviates from an expected image of the transmission elements at least within presettable tolerance limits.

With this method, at least one optoelectronic monitoring device in accordance with the invention is preferably used.

Further preferred embodiments of the invention are also set forth in the description and the drawing.

The invention will now be described in the following by way of example with reference to the drawing.

BRIEF DESCRIPTION OF THE DRAWINGS

FIG. 2 shows a further embodiment of a monitoring device in accordance with the invention;

FIG. 3 shows a further embodiment of a monitoring device in accordance with the invention;

FIGS. 4a–4c show possible embodiments of a reflector of a monitoring device in accordance with the invention; and FIG. 5 shows an embodiment of a transmission/reception device of a monitoring device in accordance with the invention with a modular design.

DESCRIPTION OF THE PREFERRED EMBODIMENTS

Figure 1:
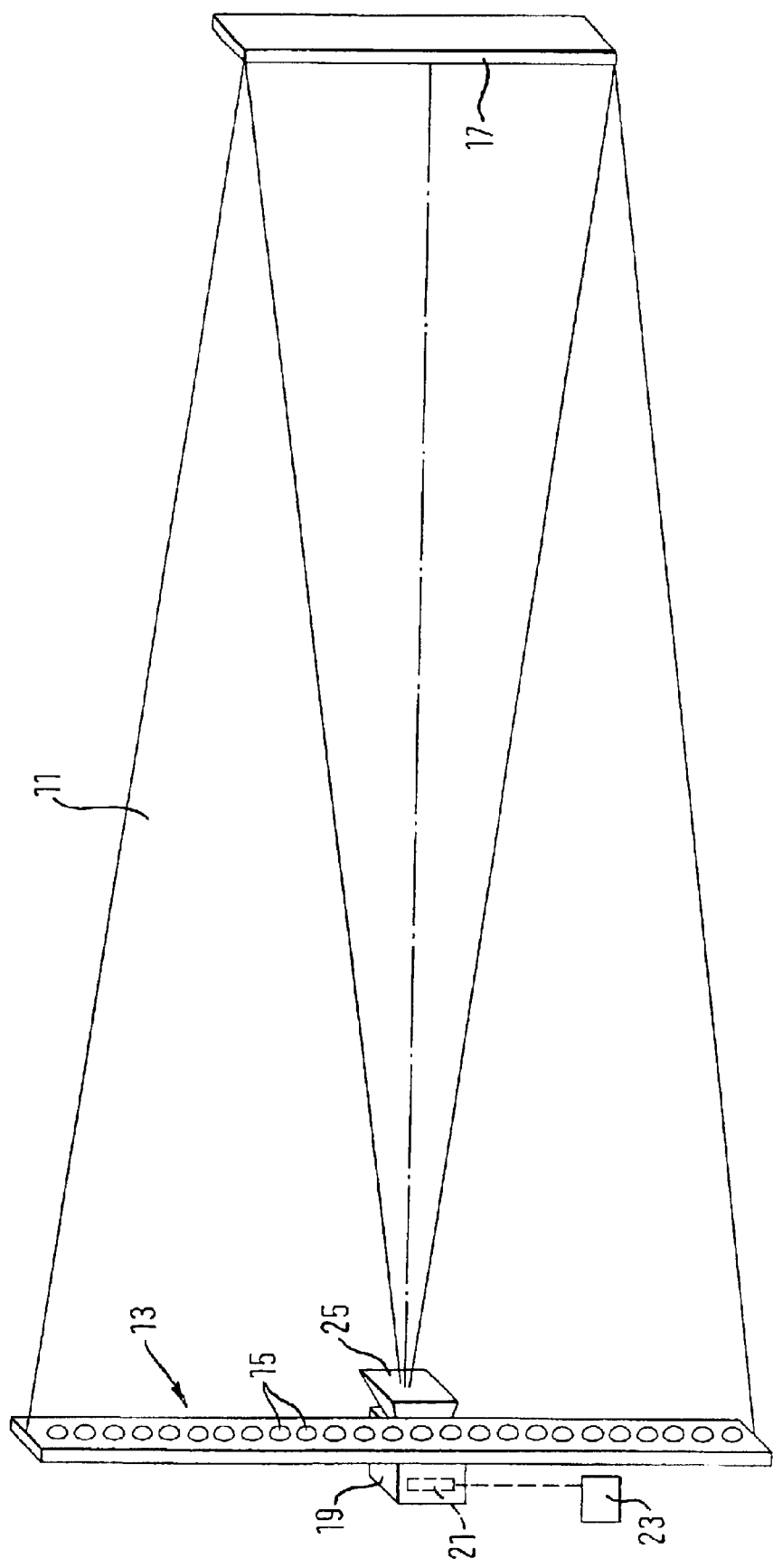
FIG. 1 is a schematic representation of an optoelectronic monitoring device in accordance with an embodiment of the invention.

The monitoring device in accordance with the invention shown schematically in FIG. 1 includes, on an active side, a transmitter 13 which has a plurality of individual transmission elements 15 which are each provided in the form of an LED. Generally, any desired radiation sources can be used as transmission elements 15 in accordance with the invention. The transmission elements 15 are arranged in one row in this embodiment. The monitoring device moreover includes, on its active side, a receiver 19, which has a spatially resolving reception element 21 with an optical imaging system 25 disposed in front of it. The areal reception element 21 is preferably a CCD device, a CMOS device or a PSD device, with—as already mentioned above—any desired one-dimensional or two-dimensional configuration of the reception elements 21, i.e. any single line configuration or matrix configuration, being able to be selected. The optical imaging system or optical reception system 25 preferably includes a multi-lens system of compact size, whereby a good point imaging is achieved with low distortion at a small aperture. An evaluation device 23 is connected to the reception element 21 and this will be looked at in more detail later.

The monitoring device in accordance with the invention furthermore includes, on a passive side, a reflector 17, which is made as a plane mirror in the embodiment in accordance with FIG. 1. The transmission/reception unit formed by the transmitter 13 and the receiver 19, on the one hand, and the mirror 17, on the other hand, define a monitored zone or protected zone 11. The monitoring device in accordance with the invention serves to detect the intrusion of objects, for example, of articles or persons, or body parts of persons, into the monitored region 11 or manipulations at the monitoring device.

The shape of the monitored zone 11 depends on the dimensions of the transmitter 13 and of the mirror 17. In the embodiment shown in FIG. 1, the monitored zone 11 is trapezoid in shape. A change of the shape of the monitored zone 11 can e.g. be realized by changing the dimensions of the transmitter 13 and/or of the mirror 17, with the optical imaging system 25 being adapted accordingly to ensure that the group of transmission elements 15 is completely imaged.

The area of the reception element 21 of the receiver 19 arranged in direct proximity to the transmitter 13, which is sensitive to radiation, is substantially smaller in this embodiment than the area taken up by the transmission elements 15 of the transmitter 13. The optical reception system 25 is designed in dependence on the relative arrangement of the transmitter 13 and of the reflector 17 such that the group of transmission elements 15 is completely imaged on the reception element 21.

If the sensor 13, the reflector 17 and the receiver 19 are arranged and aligned relative to one another in accordance with their purpose and if no object lying above the detection limit of the monitoring device is located in the monitored zone 11, a pattern is produced on the transmission element 21 by the transmission elements 15 which is expected with a proper state of the monitoring device and of the monitored zone 11 and which is in the following also termed the expected pattern or expected image.

The maximum resolution of the monitoring device, i.e. the minimum size from which objects intruding into the monitored zone 11 are reliably detected irrespective of where they intrude, depends on the spacing of two adjacent transmission elements 15 of the transmitter 13. The actual resolution of the monitoring device varies with the position of the object intruding into the monitored zone 11 between the transmitter 13 and the reflector 17.

Objects above the detection limit have the consequence that the radiation transmitted from one or more transmission elements 15 is interrupted and, as a result, the transmission element(s) 15 in question are not imaged on the reception element 21. The pattern actually produced and detected on the reception element 21 thus deviates from the expected pattern. This interference caused by an intruding object can as a result be recognized by means of the evaluation device 23 by a comparison of the actual pattern on the reception element 21 with the expected pattern.

The evaluation device 23 can e.g. switch off the machine in question, for whose monitoring the device in accordance with the invention has been provided, for example, by outputting a control signal and/or can produce a warning signal when such an interference is recognized.

Since the pattern actually produced on the reception element 21 not only depends on whether an object exceeding the detection limit intrudes into the monitored zone 11 or not, but is also defined by the geometry of the monitoring device, manipulations of the monitoring device likewise result in a deviation from the expected pattern on the reception element 21. For instance, a displacement of the mirror 17 relative to the transmitter 13 results, for example, in a changed image of the transmission elements 15 on the reception element 21. Additional beam deflection means brought into the monitored zone 11 for manipulation purposes, for example, also result in a change in the pattern formed on the reception element 21 by the transmission elements 15 and can therefore be detected by means of the evaluation device 23.

If a CCD matrix is used as the reception element 21, preferably all transmission elements 15 are operated synchronously. This allows, in an advantageous manner, a so-called CW operation with long integration times. When a PSD device is used as the reception element 21, the transmitter 13 is operated in a sensing or scanning mode; i.e. the transmission elements 15 are operated in a pulsed manner.

A favorable energy balance can be realized in that the transmission elements 15 are given a directional characteristic. The emitted radiation power of the transmitter 13 can be reduced in this manner. To ensure an imaging of all the transmission elements 15, and in particular of the outer transmission elements 15, in this case as well, the transmission elements 15 can be tilted relative to one another and thus in particular the outer transmission elements 15 can be aligned directly.

The size of the monitored zone 11 can be varied by changing the spacing between the transmitter 13 and the reflector 17. This change in range can be compensated by adapting or replacing the optical reception system 25 of the receiver 19.

The design geometry of the monitoring device in accordance with the invention has the advantage that external interference radiation, i.e. interference radiation not originating from the transmission elements 15, cannot reach those regions of the reception element 21 to which the effective radiation emitted by the transmission elements 15 is incident.

If the reception element 21 is suitable for taking a photograph and is provided e.g. in the form of a CCD device, additional information from the environment can moreover be photographed as well in an advantageous manner by the monitoring device.

FIG. 2 shows a variant of the monitoring device in accordance with the invention in which the monitored region 11 has a rectangular shape. In this embodiment, two receivers 19 are provided which each have a reception element (not shown) and which are arranged inwardly inclined at the outer ends of the transmitter 13. All transmission elements 15 of the transmitter 13, i.e. the whole group of transmission elements 15, are imaged on each reception element.

Due to the use of a plurality of receivers 19, or of reception elements, the possibility not only exists of generally adjusting the shape of the monitored zone 11 as desired, but the receivers 19 can moreover mutually monitor one another, since interference, e.g. by a non-authorized displacement of the mirror 17, has an effect on both receivers 19. This advantageously enhances the operating security.

In accordance with the invention, further receivers 19 can be provided, as is indicated in FIG. 2 by the central receiver 19 corresponding with respect to its arrangement to the central perspective arrangement of the receiver in FIG. 1. A mutual monitoring of the receivers 19 takes place here in that all transmission elements 15 are imaged simultaneously on a plurality of receivers 19. All receivers 19, or reception elements 21, are preferably connected to a common evaluation device (not shown).

FIG. 3 shows a further variant of the invention with a two-dimensional arrangement of the transmission elements 15. A three-dimensional monitored zone can thereby be realized. The reflector 17, again formed as a plane mirror, is matched to the shape of the transmitter 13, which is rectangular in this example. In the embodiment shown, the transmission elements 15 are arranged in transmission lines and transmission gaps extending perpendicular to one another; however, in accordance with the invention, generally any desired even distribution of the transmission elements 15 is possible.

FIG. 4 shows possible embodiments of the reflector 17 deviating from the design as a plane mirror.

In the variant in accordance with FIG. 4a, the reflector 17 includes two individual mirrors 17a, 17b, which extend perpendicular to one another and which thereby form a retro-reflector or triple mirror. Incident beams are reflected parallel to the direction of incidence irrespective of their angle of incidence, as is indicated in FIG. 4a. Such a retro-reflector 17 increases the tolerance with respect to misalignments and thus increases the angular availability with respect to a reflector made as a plane mirror.

An increase in the angular availability, with a simultaneous reduction in the construction depth with respect to the variant of FIG. 4a, is achieved in accordance with the embodiment of the invention of FIG. 4b in that the reflector 17 includes a plurality of individual retro-reflectors 17a, 17 which, in this version, are each of elongate shape. Generally, in accordance with the invention, any desired arrangement of a plurality of retro-reflectors can be used.

In the variant of FIG. 4c, two plane mirrors 17a, 17b are provided which are arranged next to one another and which are tilted toward one another about an axis, with the tilt axis extending perpendicular to a plane which extends perpendicular to the mirror planes of the mirrors 17a, 17b. The monitored zone can be split up into part sections, which overlap one another, by such a relative tilting of a plurality of individual reflectors.

FIG. 5 shows a further embodiment of the monitoring device in accordance with the invention, in which a respective transmitter 13 is combined with a single row arrangement of transmission elements 15 and a receiver 19 arranged in a line with the transmission elements 15 to form a unit. A plurality of the modules 27 formed in this manner can be combined in a simple manner to form a total system of generally any desired size, as is indicated schematically in FIG. 5. Such a modular system can be directly matched to the respective application purpose with very little effort.

What is claimed is:

1. An optoelectronic monitoring device for monitoring a monitored zone comprising a light transmitter arranged at a first end of the monitored zone which includes a plurality of spaced-apart transmission elements the transmission elements simultaneously transmitting electromagnetic radiation into the monitored zone, a reflector arranged at a second end of the monitored zone opposite the first end for reflecting radiation from the transmission elements, a receiver which includes a spatially resolving reception element for detecting a radiation pattern formed by radiation reflected by the reflector, the transmitter, the reflector and the receiver being arranged so that the radiation pattern generated by the plurality of transmission elements is imaged on the reception element, and an evaluation device coupled to the spatially resolving reception element and comparing the radiation pattern detected by the reception element with a predetermined expected radiation pattern from the transmission elements.

2. A device according to claim 1 wherein the receiver is positioned proximate the transmitter.

3. A device according to claim 1 wherein the receiver and the transmitter are combined and form a module.

4. A device according to claim 1 including a plurality of modules each comprising at least one transmitter and at least one receiver which form a transmission/reception unit.

5. A device according to claim 1 wherein the transmission elements are arranged in a single row.

6. A device according to claim 1 wherein the transmission elements are arranged in a plurality of rows which form parallel and perpendicular lines of transmission elements.

7. A device according to claim 1 comprising a single reception element on which the radiation pattern formed by radiation reflected by the reflector is completely imaged.

8. A device according to claim 1 including a plurality of spaced-apart reception elements, and wherein radiation reflected by the plurality of reflectors is imaged on each reception element.

9. A device according to claim 1 wherein the reflector comprises a mirror unit.

10. A device according to claim 9 wherein the mirror unit comprises one plane mirror.

11. A device according to claim 1 wherein the reflector comprises a plurality of individual reflectors each formed by a plane mirror.

12. A device according to claim 1 wherein the reflector comprises first and second individual reflectors which are tilted towards each other.

13. A device according to claim 1 wherein the reflector comprises first and second plane mirrors which are arranged at a right angle to each other so that radiation received and reflected by the reflector is parallel irrespective of an angle of incidence of the received radiation on the mirror.

14. A device according to claim 1 including an optical imaging system disposed in front of the reception element.

15. A method for detecting objects intruding into a monitored zone comprising transmitting into the monitored zone electromagnetic radiation from a plurality of spaced-apart transmission elements arranged at a first end of the monitored zone, reflecting radiation transmitted by the transmission elements at a second end of the monitored zone opposite the first end, imaging the radiation from the plurality of transmission elements on a ment to form an imaged radiation pattern thereon, comparing the imaged radiation pattern formed on the spatially resolving reception element with a predetermined expected radiation pattern, and using a mismatch between the imaged radiation pattern and the expected radiation pattern to generate a signal.

* * * * *